United States Patent [19]
Goodnow et al.

[11] Patent Number: 5,918,246
[45] Date of Patent: Jun. 29, 1999

[54] APPARATUS AND METHOD FOR PREFETCHING DATA BASED ON INFORMATION CONTAINED IN A COMPILER GENERATED PROGRAM MAP

[75] Inventors: Kenneth Joseph Goodnow, Essex Junction; Clarence Rosser Ogilvie, Huntington; Wilbur David Pricer, Charlotte; Sebastian Theodore Ventrone, Burlington, all of Vt.

[73] Assignee: International Business Machines Corporation, Armonk, N.Y.

[21] Appl. No.: 08/788,870

[22] Filed: Jan. 23, 1997

[51] Int. Cl.$^6$ .......................... G06F 12/00; G06F 13/00; G06F 9/38

[52] U.S. Cl. .................... 711/137; 395/383; 395/584; 711/204

[58] Field of Search .................................. 711/137, 204, 711/213; 395/383, 584, 586

[56] References Cited

U.S. PATENT DOCUMENTS

| | | | |
|---|---|---|---|
| 5,423,048 | 6/1995 | Jager | 711/137 |
| 5,652,858 | 7/1997 | Okada et al. | 711/137 |
| 5,687,349 | 11/1997 | McGarity | 711/137 |
| 5,713,003 | 1/1998 | DeWitt et al. | 711/137 |

OTHER PUBLICATIONS

Callahan et al, "Software Prefetching," ASPLOS–N Proceedings, Apr. 1991, pp. 40–52.

Klaiber et al, "An Architecture for Software Controlled Data Prefetching," Proc. 18$^{th}$ Annual Inter. Symp. on Comp. Arch., May 1991, pp. 43–63.

Mowry et al, "Design & Evaluation of a Compiler Algorithm for Prefetching," Proc. 5$^{th}$ Inter. Conf. on Arch. Supp. for Prog. Lang. & Oper. Sys., Oct. 1992, pp. 62–73.

Mowry et al, "Tolerating Latency Through Software Controlled Prefetching in Shared–Memory Multiprocessors," Jour. of Par. and Distr. Computing 12, (1991), pp. 87–106.

Gornish et al, "Compiler Directed Data Prefetching in Multiprocessors With Memory Hierarchies," Proc. of 1990 Inter. Conf. on Supercomputing, 1990, pp. 354–368.

Chen et al, "Data Access Microstructures for Superscalar Processors with Compiler Assisted Data Prefetching," Proc. of Microcomputing 24 (1991), pp. 69–73.

*Primary Examiner*—Glenn Gossage
*Attorney, Agent, or Firm*—Schmeiser, Olsen & Watts; Eugene I Shkurko

[57] ABSTRACT

An apparatus and method for pre-loading a cache memory based on information contained in a compiler generated program map are disclosed. The program map is generated by the compiler at the time source code is compiled into object code. For each application program, the user would have this program map stored with the object file. At the beginning of the program execution cycle, the operating system will determine whether or not a program map exists for the application. If a program map exists, the operating system will load the program map into an area of RAM designated as the program map random access memory (RAM). The program map will be used to pre-load the cache with the appropriate data and instructions for the central processing unit (CPU) to process. The program mapping would be the address location of each jump/branch target that the CPU might encounter during the execution cycle. Each of these locations represent a starting point for a new code sequence. At the start of the map will be an identifier field to mark the start of the map. The next field in the program map will provide the entry point of the starting address of the application program. If a particular application program does not have a program map, the program and cache operation will remain unchanged. This feature provides backwards compatibility with existing application programs.

16 Claims, 5 Drawing Sheets

APPARATUS AND METHOD FOR PREFETCHING DATA BASED ON INFORMATION CONTAINED IN A COMPILER GENERATED PROGRAM MAP

BACKGROUND OF THE INVENTION

1. Technical Field

This invention generally relates to computer system memory and more specifically relates to cache memory management.

2. Background Art

Today, our society is heavily dependent upon computers for everyday activity. Computers are found in homes, in business offices, and in most production and manufacturing environments. Most computer systems are controlled by a central processing unit (CPU) and have various levels of memory which can be used by the CPU to perform the various functions for which it has been programmed. Typically, computer programs are loaded into the computer system's memory storage areas and executed by the CPU. The programs and data are stored in different areas of the computer system's memory depending on what type of function the CPU is performing. Traditionally, the computer system's memory has been classified as either main memory (primary or main storage) or secondary memory (secondary storage).

Programs and data need to be in main memory in order to be executed or referenced by a running program. Programs or data not needed immediately may be kept in secondary memory until needed and then brought into main storage for execution or reference. The internal storage locations of a given memory location are often referred to as "lines of memory." Secondary memory media such as tape or disk are generally less costly than the main memory and have much greater capacity. Main memory may generally be accessed much faster than secondary memory.

In the 1960s it became clear that the traditional memory storage hierarchy could be extended by one more level with dramatic improvements in performance and utilization. This additional level, the "cache," is a high-speed memory that is much faster than the main memory. Cache storage is relatively expensive compared with main memory and therefore, in a typical computer system, only relatively small amounts of cache memory are used. In addition, limiting the size of cache storage enhances the speed of the cache.

Cache memory imposes one more level of memory management overhead on the computer system. Programs or data in the main memory are shuttled or "swapped" into the high-speed cache before being executed or referenced. The programs or data that were previously residing in the cache must be "swapped" out. Cache memory generally operates faster than main memory, typically by a factor of five to ten times and may, under certain circumstances, approach the operational speed of the CPU itself. By keeping the most frequently accessed instructions and/or data in high speed cache memory, average memory access time for the system will approach the access time of the cache. There is a certain amount of overhead involved in shuttling information between various memory locations. This overhead is kept as small as possible so that it does not cancel out the performance increase achieved by utilizing cache storage. In addition, if the specific program instruction to be executed has been pre-loaded into the cache, the CPU may execute the program instruction without returning to either main memory or secondary memory, thereby significantly increasing the operational speed of the system.

Cache memory may be subdivided into different categories based on what part of the computer system it is located on or associated with. "On-chip" cache memory is on the same microprocessor chip the CPU and is usually referred to as Level 1 or L1 cache memory. Additional cache memory that is not located on the same chip with the microprocessor is usually referred to as Level 2 (L2) or level 3 (L3) cache memory.

Even with a cache memory management scheme, there are additional, related problems that can cause system performance to suffer. For example, in data processing systems with several levels of memory storage, a great deal of shuttling goes on in which programs and data are moved back and forth between the various memory levels. This shuttling consumes system resources such as CPU time and bus bandwidth that could otherwise be put to more productive processing use. This problem has been exacerbated in recent years by the growing discrepancy between the processing speed of the CPU and the operational speeds of the different computer system components used to transfer information and instructions to the CPU. In the past few years, the processing speed of CPUs in general has increased tremendously while the operational speeds of related system components have not progressed as quickly.

For example, a few short years ago, CPU processing speeds in the range of 16 megahertz (MHz)–33 MHz were fairly common. Presently, however, CPUs operate at processing speeds in excess of 180 MHz with some CPUs exceeding even 200 MHz. In contrast, the processing speed of other data processing system components, particularly those components used to deliver data to the CPU for processing, have not kept pace. This has resulted in a well-known performance problem for computer systems. Specifically, even with a cache memory management system in place, it can take so long to deliver information to the cache that the CPU may spend a relatively long period of time waiting for required information to be loaded into the cache. Whenever the CPU needs to process data or instructions that are unavailable in the cache, the CPU "stalls" until the necessary information is loaded from the external memory bus into the cache. The CPU, in effect, is "starved" for data and wastes valuable processing time waiting for the necessary data or instructions to become available.

Cache memory is often used in high speed data processing system architectures which also often include multiple interrupt levels. An interrupt is a signal sent to the CPU which alerts the CPU that another task needs to be serviced. As is well known to those skilled in the art, an interrupt may be an "external" interrupt, for example from a keyboard, disk drive, or other peripheral unit, or may be an "internal" interrupt from an internally generated timer. Upon occurrence of an interrupt, the currently executing task is interrupted and a first (interrupting) task is performed. The interrupted task may be resumed after completion of the interrupting task.

Frequent task interruptions typically degrade the performance of a cache memory. When the currently executing task is interrupted, the cache has been loaded with the data and instructions necessary to process the specific task that is executing at the time the interrupt occurs. The interrupting task is typically unrelated to the previously executing task and therefore, the data and instructions in the cache are not the data and instructions required to perform the interrupting task. This means that the cache must be emptied out and loaded with data and instructions necessary to process the interrupting task. Once again, frequent trips to main memory may be required before the cache will be loaded with the new data and instructions necessary to process the interrupting task. Accordingly, the performance of the CPU decreases dramatically and, correspondingly, overall system performance will be degraded.

Similarly, once the interrupting task has run to completion and the interrupted task resumes processing or some other scheduled task begins processing, the data and instructions loaded in the cache for the interrupting task are typically unrelated to the data and instructions necessary for processing the next task, and the cache will have to be loaded with a different set of data and instructions once again. Obviously, the more frequently these interrupts occur, the more frequently the cache must be reloaded with data and instructions from main memory and, once again, overall system performance will suffer. Therefore, in order to improve system performance, the cache must ideally contain the data and instructions necessary for the CPU to complete any task that is currently being processed as quickly as possible.

As explained above, the loading of data and instructions from main memory into a cache over the external memory bus can become a significant bottleneck, especially if the CPU frequently switches tasks and needs additional information loaded into the cache. Once the cache is loaded with the necessary data, overall system operation can approach the maximum operational speed of the CPU and the cache. With the recent increase in data processing systems using multi-tasking operating systems, frequent interrupts are becoming even more of a problem for system performance. However, without a way to efficiently load and optimize the contents of the cache for more effective processing by the CPU, the overall performance of data processing systems will continue to suffer.

Therefore, there exists a need to provide an apparatus and method to more effectively utilize cache memory and thereby improve the performance of a CPU-based data processing system. This apparatus and method should allow the cache to be loaded with the data and instructions most likely to be requested by the CPU at the times the CPU is most likely to request the given data and instructions. This apparatus and method should increase overall system performance by decreasing CPU stalls and by providing data and instructions to the cache in a more efficient manner than existing systems.

SUMMARY OF THE INVENTION

According to the present invention, a compiler generated program map for pre-fetching data and instructions for the cache is disclosed. For every compiled program, the compiler which compiled the program also typically generates an output listing. The output listing represents the object code along with the address flow for the compiled program. In most typical application programs, the instruction addresses increase incrementally, occasionally interrupted by a jump instruction. These jump instructions typically occur every 20 or so cycles. Each of these jump instructions has a target address associated with it. A list of these target addresses can be used to describe the possible alternative paths which the program may travel during the execution sequence. These paths form the basis of the "program map" used in this invention. This portion of the program map is generated by the compiler at the time the source code is compiled into object code.

At the time of compilation, the entry points to each of the possible memory locations that might be accessed during the course of program execution are stored in a designated portion of the program output listing. This program mapping would contain the address location of each jump/branch target. Each of these locations represent a starting point for a new code sequence. At the start of the program map will be an identifier field used to mark the start of the map. The next field in the program map will provide the entry point of the starting address of the application program. To use the present invention, future application programs will store the program map with the object file.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The Overview Section immediately below is intended to provide an introductory explanation of the basic theory of cache memory operations for individuals who need additional background in this area. Those who are skilled in the art may wish to skip this section and begin with the Detailed Description Section instead.

Overview

The program instructions and data needed by a CPU are selected and placed into cache memory by utilizing a phenomenon known as "locality of reference." The locality of reference phenomenon recognizes that most computer program instruction processing occurs in a sequential fashion with multiple loops, and with the CPU repeatedly referring to a set of instructions in a particular localized area of memory. Thus, loops and subroutines tend to localize the references to memory for fetching instruction. Similarly, memory references to data also tend to be localized, because table look-up routines or other interactive routines typically refer to a small portion of memory repeatedly.

In view of the phenomenon of locality of reference, a small, high speed cache memory may be provided for storing a block of memory containing data and/or instructions which are presently being processed. Although the cache is only a small fraction of the size of main memory, a large fraction of memory requests over a given period of time will be found in the cache memory because of the locality of reference property of programs and data.

In a CPU with a relatively small, relatively high speed cache memory and a relatively large, relatively low speed main memory, the CPU first examines the cache when a memory access instruction is processed. If the desired instruction or word is found in the cache, it is read directly from the cache. If the word is not found in the cache, the main memory or secondary storage is accessed to read that word, and a block of words containing that word (typically called a "page") is transferred to cache memory. Accordingly, future references to memory are more likely to find the required words in the cache memory because of the locality of reference property.

The performance of cache memory is frequently measured in terms of a "hit ratio." When the CPU refers to memory and finds the word in cache, it produces a "hit." If the word is not found in the cache, then it is located in main memory and must be transferred from main memory to the cache for execution. This is called a "miss." The ratio of the number of hits divided by the total CPU references to memory (i.e., hits plus misses) is the hit ratio. Experimental data obtained by running representative programs has indicated that hits ratios of 0.9 (90%) and higher may be obtained. With such high hit ratios, the memory access time of the overall data processing system approaches the memory access time of the cache memory, significantly improving system throughput. Accordingly, the average memory access time of a given data processing system can be improved considerably by implementing a cache memory scheme.

Most data processing systems are typically used to perform many independent tasks. When a task is first begun, the hit ratio of the cache is typically low because the instructions and/or data necessary for processing will not be found in the cache. Such a cache is known as a "cold" cache. Then, as processing of a task continues, more and more of the instructions and/or data which are needed have been loaded from main memory into the cache and may be executed in the cache. The cache is then referred to as a "warm" cache because the hit ratio becomes relatively high.

In order to maximize the hit ratio, many data processing system architectures allow system control over the use of the cache. For example, the cache may be controlled to store instructions only, data only, or both instructions and data. Similarly, the cache may be controlled to lock a particular instruction or sequence of instructions into the cache, without allowing overwrites, thereby preserving frequently used instructions for the CPU to access.

Detailed Description

With a preferred embodiment of the present invention, at the beginning of the program execution cycle, the operating system will check to see if a program map exists for the application. If a program map exists, the operating system will load the program map into an area of random access memory (RAM) designated as the program map RAM. In practice, the program map RAM will only contain the program map information for the current page being accessed by the CPU. The physical limits on the size of the program map RAM can be decided as a matter of design choice or preference. If a particular application program does not have a compiler generated program map, the operation of the application program and memory components will remain unchanged from previous systems. This feature makes the present invention backwards compatible with existing application programs.

Figure 1:
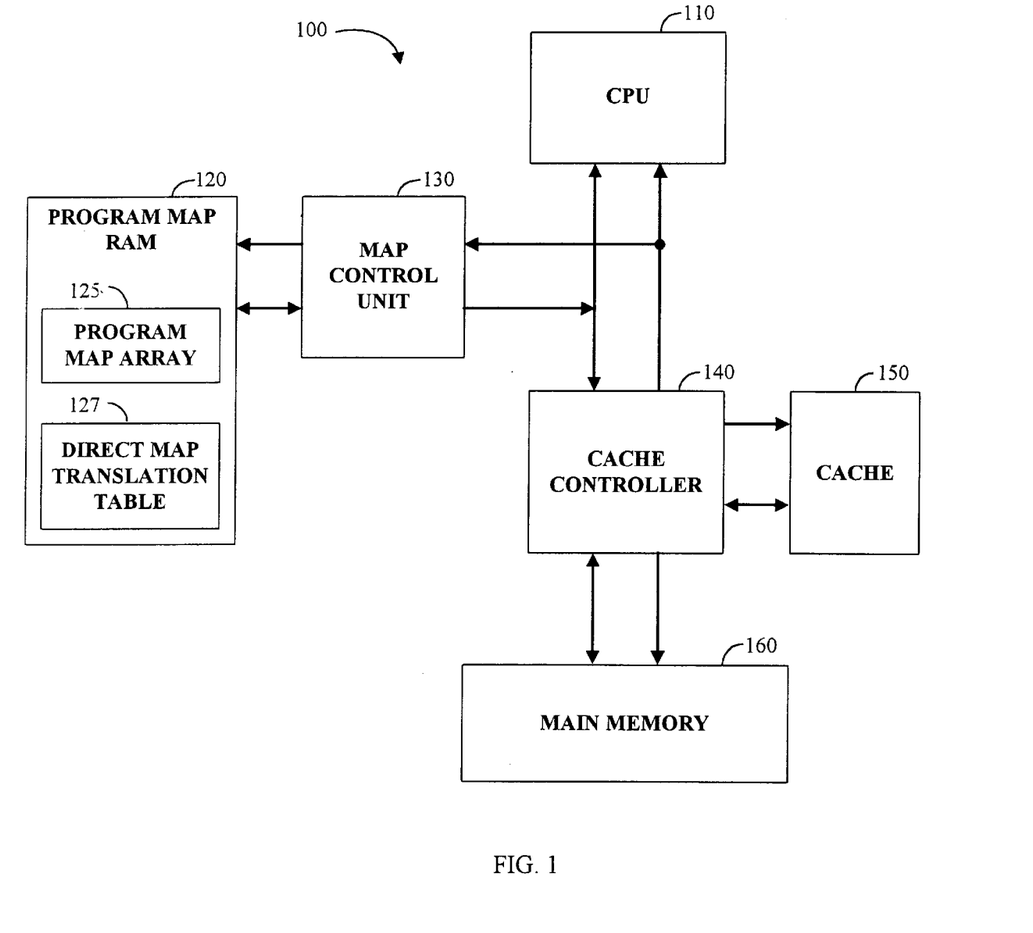
FIG. 1 is a block diagram of a preferred embodiment of a data processing system according to the present invention.

Referring now to FIG. 1, a data processing system 100 according to a preferred embodiment of the present invention includes: a CPU 110; a program map RAM 120; which includes a program map array 125 and a direct map translation table 127; a map control unit 130; a cache controller 140; a cache memory 150; and a main memory 160.

CPU 110 is any general purpose CPU known to those skilled in the art. CPU 110 is capable of multi-processing tasks driven by internal or external interrupts. Main memory 160 may be any memory device used as main memory for a data processing system by those skilled in the art. This may include any combination of Random Access Memory (RAM), Dynamic RAM (DRAM), Static RAM (SRAM), FLASH memory, etc. Main memory 160 may be implemented by using chips, cards, boards, solid state devices, etc. In addition, memory refers to any location in the logical address space of CPU 110.

Program map RAM 120 is an area of memory, accessible by CPU 110, where the compiled program map is stored. This memory storage area may be a designated part of main memory or, preferably, a dedicated area of memory specifically allocated as map cache RAM, as shown in FIG. 1.

In a preferred embodiment, map control unit 130 is a machine that interprets a set of linked data structures stored in program map array 125. Program map array 125 is located within program map RAM 120. The linked data structures stored in program map array 125 contain the linking real addresses and the ranges of the program and data segments for the various pages of the executing program. Each data structure has an entry in direct map translation table 127 also located within program map RAM 120. Each entry in direct map translation table 127 is indexed from the real address of the memory segment loaded in main memory 160 and an entry address to the data structure located in program map array 125. This structure allows for fast access by map control unit 130 to the data structure associated with a given address of the executing program.

Also, within each data structure in program map array 125 are address links to other input segments that need to be preloaded if a given program segment is accessed. These input segment addresses are the possible alternative memory locations that could be requested for this given program memory segment. The data structures in program map array 125 are used by map control unit 130 to preload pages or lines into cache 150 that may be used in the near future by the currently executing program.

It should be noted that the present invention uses real memory addresses. In computer memory models, "real" addresses, "virtual" addresses, and "effective" addresses can all be used as locations for storing information. An effective address is the linear address space used by a computer programmer to develop program code. This effective address is expanded into a virtual address by combining information from internal address registers and the effective address. A real address is the address that is used to drive the actual main memory modules. The real address is generated from the virtual address by using a virtual paging unit. The virtual paging unit is the device that translates virtual memory address locations into real memory locations. The use of real memory addresses places an additional burden on the task loader because the task loader must pre-translate the effective address to the real address for all the data structures contained in program map array 125.

In addition, virtual paging considerations must be addressed. A "virtual page" is a block of contiguous memory locations (typically 4 k bytes) and represents the minimum relocatable element from a virtual memory location (or address) to a real memory location (or address). Whenever virtual paging is used, all virtual page crossings (i.e., crossing the boundaries between any two virtual pages) must be considered as potential branches in the program map and the associated portion of the program map for these virtual page crossings must be generated. Alternatively, a similar structure could be used wherein effective addresses would be placed in front of the paging unit (rather than behind) and the invention could simply use the existing virtual memory translator.

Cache 150 is a relatively high-speed memory that works in coordination with cache controller 140 to store and supply data and instructions for processing by CPU 110.

When an application program is initially loaded into memory, the memory controller (not shown) will also load the program map or relevant portions of the program map into program map RAM 120. Map control unit 130 is the guide that cache controller 140 will use to pre-load cache 150 in anticipation of CPU 110's processing needs. At any given point during program execution, map control unit 130 can provide the address for the next instructions or data required for processing by CPU 110 based on the address flow for the instructions contained on the page of memory that CPU 110 is currently processing.

Then, using available bus bandwidth not required by CPU 110, cache controller 140 will load cache 150 with portions of the application from main memory 160 that correspond to the flow and execution sequence of the program map stored in program map RAM 120. The directions from map control unit 130 appear to cache controller 140 to be the same as instructions from CPU 150 to fetch data or instructions. However, instead of being provided for immediate execution, cache controller 140 pre-loads the data or instructions as directed by map control unit 130 into cache 150 for future execution by CPU 110.

Once an application has been loaded into main memory 160, cache controller 140 will continue to rely on map control unit 130 to determine what data or instructions to pre-load into cache 150 for execution by CPU 110. As long as cache 150 contains the information required for execution by CPU 110, then the maximum bandwidth of CPU 110 to system 100 can be maintained. Map control unit 130 is able to anticipate the branch locations for the current code locations and for all possible short term jumps or relocations. If system 100 has enough bandwidth to allow cache 150 to be pre-loaded effectively by map control unit 130, then system 100 should approach the desired 100% hit ratio for maximum processing efficiency.

Figure 2:
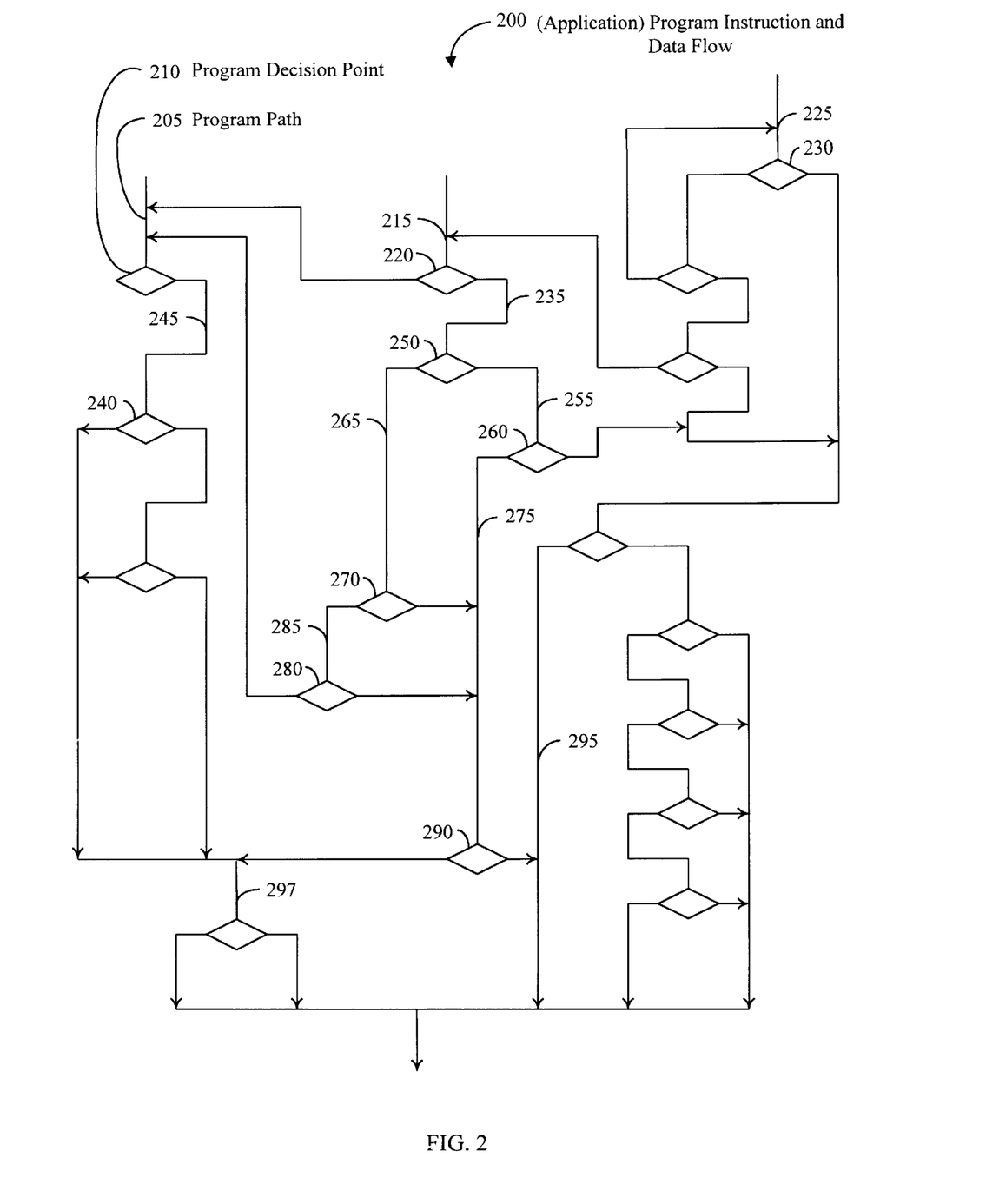
FIG. 2 is a graphical representation of a portion of a program map generated by a compiler in accordance with a preferred embodiment of the present invention.
Figure 3:
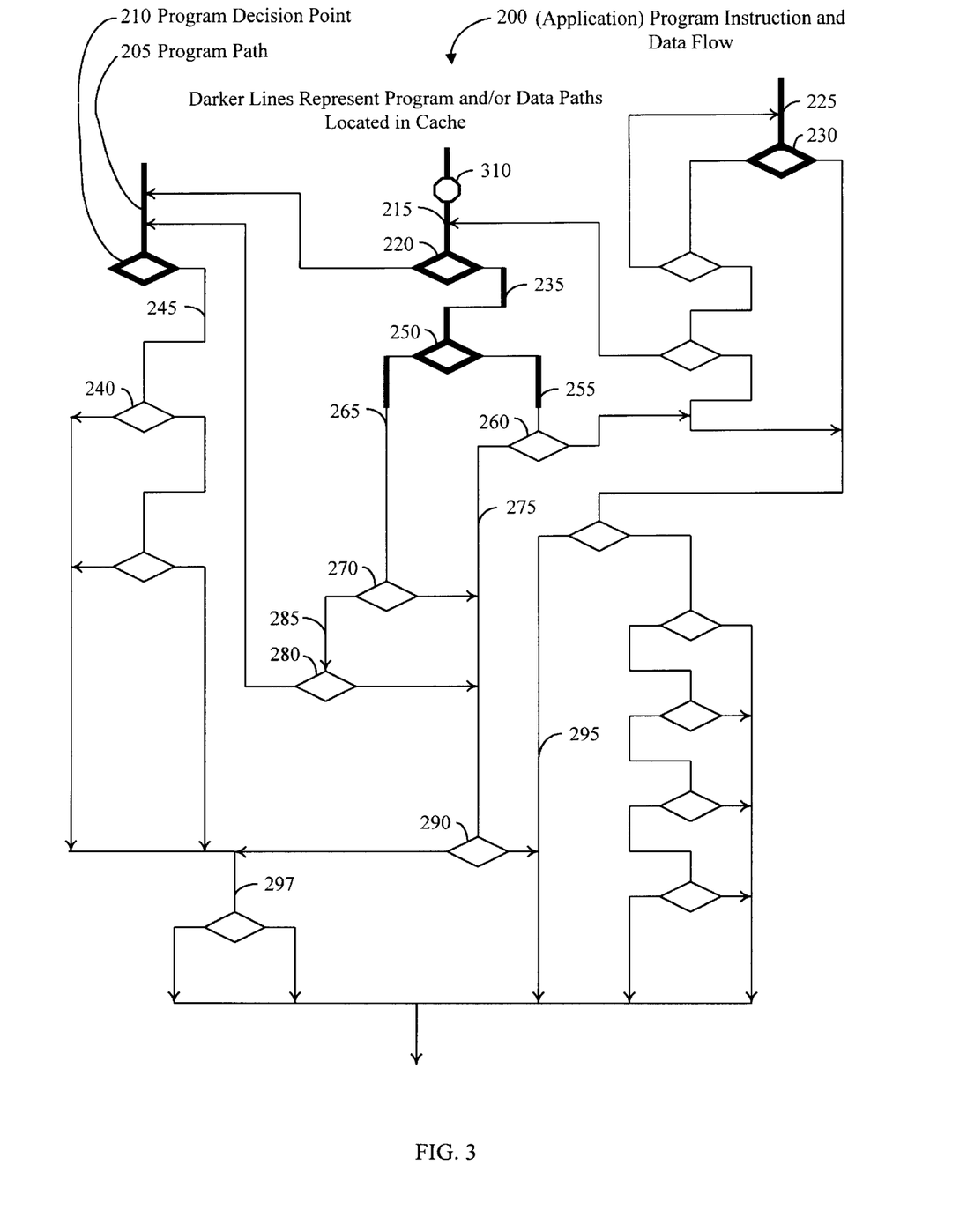
FIG. 3 is a graphical representation of the program flow through the program map of FIG. 2 at a certain point in time.
Figure 4:
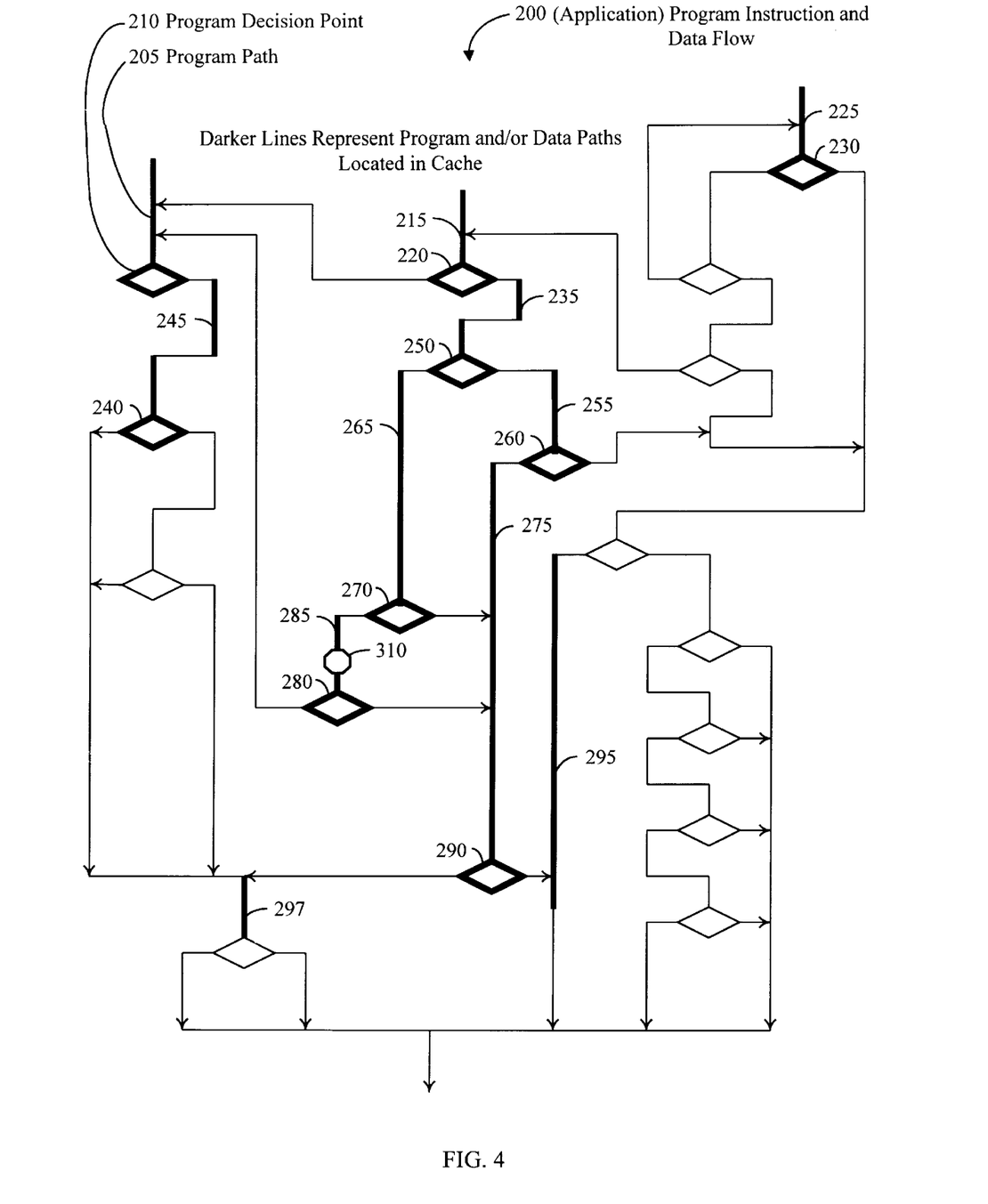
FIG. 4 is a graphical representation of the program flow through the program map of FIG. 2 at a later point in time.

Referring now to FIGS. 2–4, the progression of the execution sequence of a typical application program can be described graphically.

In FIG. 2, a portion of an application program instruction and data flow 200 has been graphically depicted with a small portion of possible program execution sequences being shown. Program paths 205, 215, 225, 235, 245, 255, 265, 275, 285, 295, and 297 represent possible alternative paths that CPU 110 (not shown) may traverse or execute in order to complete a given task or series of tasks. Each of these program paths consists of a sequential series of programmed activities that CPU 110 will execute in order. Program decision points 210, 220, 230, 240, 250, 260, 270, 280, and 290 represent points in the program flow where CPU 110 will make a processing decision and branch one way or another based upon the state of processing.

In FIG. 3, the program instruction and data flow 200 of FIG. 2 has progressed to an instantaneous execution point 310 where the instructions associated with program and/or data paths 205, 215, 225, 235, 255, and 265 have been loaded into cache 150 (not shown). Darker lines represent those program and/or data path instructions that have been pre-loaded into cache 150. These instructions have been loaded into cache 150 based upon the current state of execution for the application program being processed by CPU 110 (not shown) and information provided from program map RAM 120 (not shown). Program decision points 210, 220, and 230 also have darkened lines to represent possible branches that the program and/or data may follow. In FIG. 3, execution point 310 graphically represents the current location of program processing being performed by CPU 110. The instructions and/or data that have been pre-loaded into cache 150 will be available if and when CPU 110 needs to execute them. This will reduce or prevent CPU stalls and thereby increase the overall performance of the data processing system 100 as depicted in FIG. 1.

In FIG. 4, the program instruction and data flow 200 of FIG. 3 has progressed to an instantaneous execution point 310 where additional instructions associated with program and/or data paths 245, 275, 285, 295, and 297 have been loaded into cache 150 (not shown). Once again, these instructions have been pre-loaded into cache 150 because they represent the possible instructions that CPU 110 (not shown) may need to continue processing, depending on the processing decisions made at program decision points 210, 240, 280, and 290.

Figure 5:
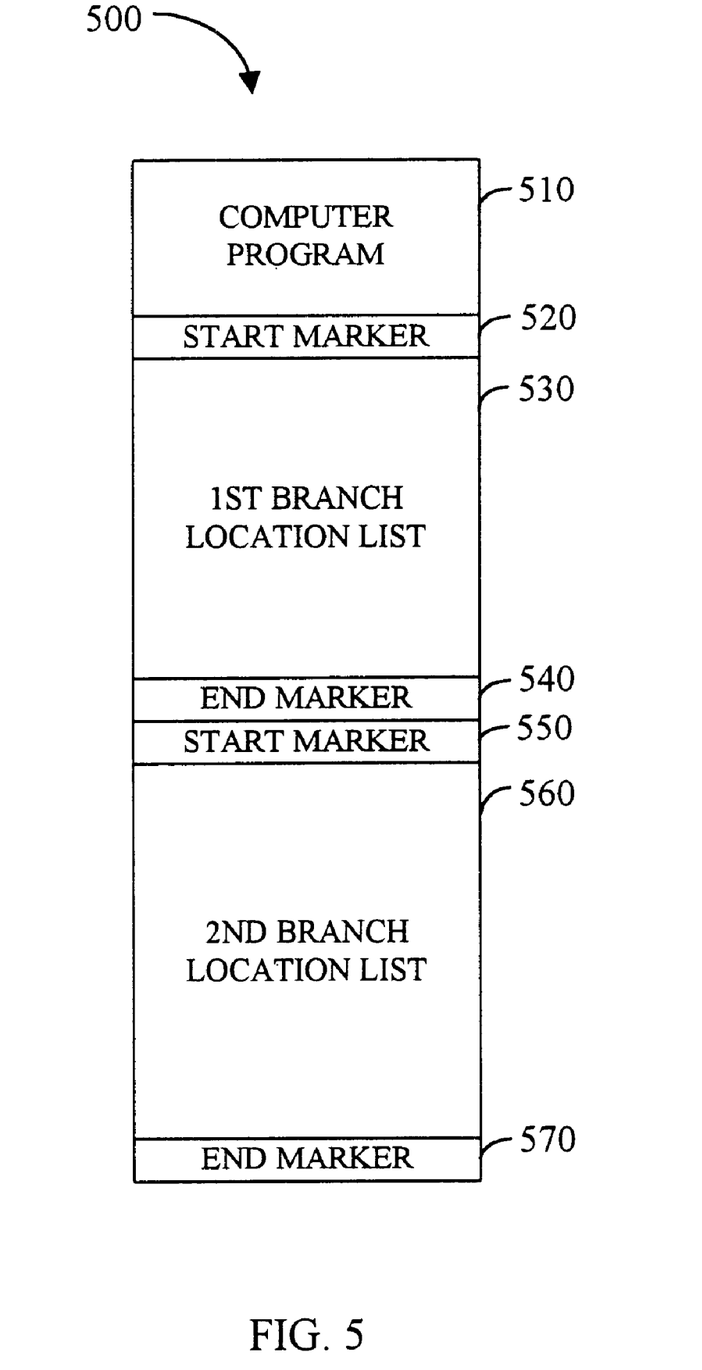
FIG. 5 is a block diagram of a portion of a memory map generated by a compiler in accordance with a preferred embodiment of the present invention.

Referring now to FIG. 5, a memory 500 is used to illustrate storage of the program map according to a preferred embodiment of the present invention. Memory 500 as shown contains: a compiled representation of a computer program 510; a start marker 520; a 1st branch location list 530; an end marker 540; a start marker 550; a 2nd branch location list 560; and an end marker 570. Memory 500 is a representative portion of a much larger computer memory storage area. Branch location lists 530 and 560 contain a listing of possible memory locations which contain the information that CPU 110 (not shown) may need to execute computer program 510.

Referring now to FIGS. 1 and 5, when a given page for computer program 510 is loaded into main memory 160, the corresponding portion of the program map, called a branch location list and delineated in memory by a start marker (i.e. 520 or 550) and an end marker (i.e. 540 or 570), is also loaded into program map array 125. Each branch location list (i.e. 1st branch location list 530) is accessed to locate the information used to pre-load cache 150 for a given page of the executing program. Each branch location list contains the offsets for the memory locations for any possible program branches associated with that given page of the executing program. For example, 1st branch location list 530 may correspond to the first page of the executing program and 2nd branch location list 560 may correspond to the second page of the executing program. Accordingly, only the branch location lists that correspond to the program pages loaded into main memory are loaded into program map array 125.

The program flow process and cache pre-loading decisions illustrated in FIGS. 2–4 can be logically extended to cover all possible paths for any given application program. By pre-loading cache 150 with the appropriate instructions and data for possible future branches, CPU stalls can be reduced and any application program using the present invention can operate more efficiently. The embodiments of the present inventions can be extended to pre-load instructions for multiple levels of branching decisions. The practical limitations of available RAM, system design parameters, available bandwidth, CPU speed, and the probabilities of selecting the appropriate branches are the only true constraints on implementation.

Since most existing compilers do not have the capability to generate a program map, the current invention may be embodied as a stand-alone add-on product for immediate compiler application and may be integrated into existing compiler products in the future.

While the invention has been particularly shown and described with reference to preferred embodiments thereof, it will be understood by those skilled in the art that various changes in form and details may be made therein without departing from the spirit and scope of the invention.

We claim:

1. An apparatus comprising:
   a central processing unit coupled to a bus;
   a memory coupled to the bus;
   a cache memory coupled to the bus;
   a computer program stored in the memory;
   a program map being stored in the memory, the program map comprising address locations of branches in the computer program and being generated before execution of the computer program; and
   a controller coupled between the central processing unit, the memory and the cache memory, the controller pre-loading data or instructions from the memory to the cache memory for use by the central processing unit during the execution of the computer program based on information in the program map.

2. The apparatus of claim 1 further comprising a compiler for generating an object code representation of the computer program and for generating the program map from the object code representation of the computer program.

3. The apparatus of claim 1 wherein the program map is stored in a portion of the memory specifically designated as a program map random access memory.

4. The apparatus of claim 3 wherein the program map random access memory comprises a program map array and a direct map translation table.

5. The apparatus of claim 1 further comprising a map control unit coupled to the bus, the map control unit interpreting the information in the program map and directing the controller to pre-load the data or the instructions.

6. A method for improving the performance of a cache memory subsystem in a data processing system having a central processing unit coupled to a bus, a memory coupled to the bus, and a cache memory coupled to the bus, the method comprising the steps of:
   generating a program map from an object code representation of a computer program, the program map comprising address locations of branches in the computer program; and
   pre-loading data or instructions from the memory to the cache memory for use by the central processing unit during execution of the computer program based on information in the program map, wherein the step of pre-loading data or instructions includes the step of using a direct map translation table to index into the program map to retrieve the information for pre-loading the cache.

7. The method of claim 6 further comprising the step of storing the program map in a program map random access memory.

8. The method of claim 7 wherein the program map random access memory comprises a program map array and the direct map translation table and wherein the method further comprises the step of storing the program map in the program map array.

9. The method of claim 8 wherein the direct map translation table comprises at least one entry and the program map array comprises at least one data structure, each entry comprising an entry address to each data structure, and wherein the step of using the direct map translation table to index into the program map further comprises the step of:
   using the at least one entry to index into the program map array to retrieve the information for pre-loading the cache.

10. The method of claim 9 wherein the at least one data structure is an array of data structures and wherein the method further comprises the step of:
    storing a branch location list for a page of memory in each data structure.

11. The method of claim 6 wherein the step of generating a program map from an object code representation of a computer program occurs prior to the execution of the computer program.

12. An apparatus comprising:
    a central processing unit coupled to a bus;
    a memory coupled to the bus;
    a cache memory coupled to the bus;
    a computer program stored in the memory;
    a controller coupled between the central processing unit, the memory, and the cache memory;
    a compiler for generating an object code representation of the computer program and for generating a program map from the object code representation of the computer program, the program map comprising address locations of branches in the computer program;
    a map control unit coupled to the bus; and
    a program map random access memory coupled to the map control unit and storing the program map and a direct map translation table, the map control unit directing the controller based on information in the program map to pre-load data or instructions from the memory to the cache memory for use by the central processing unit during execution of the computer program, wherein the map control unit retrieves the information from the program map by using the direct map translation table to index into the program map.

13. The apparatus of claim 12 wherein the program map is stored in a program map array.

14. The apparatus of claim 12 wherein the program map random access memory comprises a program map array and the direct map translation table.

15. The apparatus of claim 12 wherein the program map random access memory comprises a program map array and the direct map translation table and wherein the program map is stored in the program map array.

16. The apparatus of claim 12 wherein the program map is generated before the execution of the computer program.

* * * * *